April 19, 1960   F. P. BALDWIN ET AL   2,933,117
RUBBERY LAMINATED STRUCTURES
Filed Dec. 10, 1956
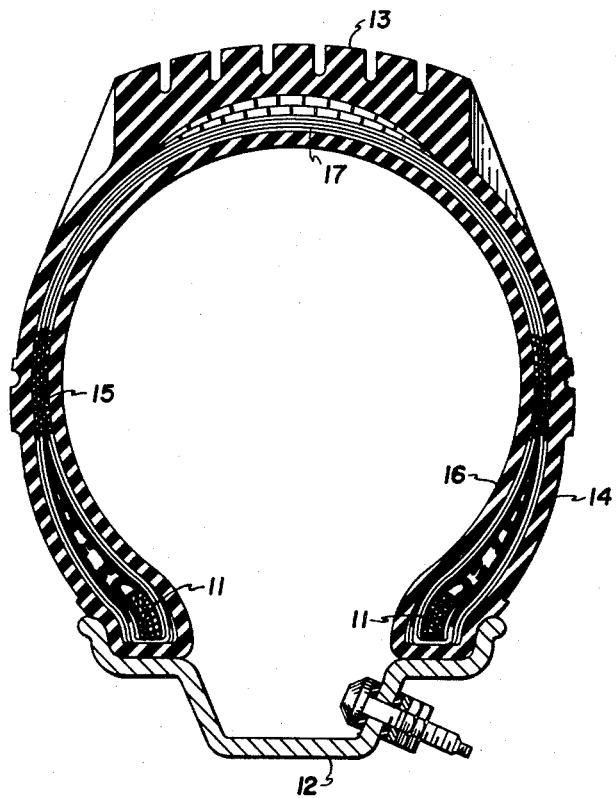
Francis P. Baldwin
Samuel B. Robison    Inventors
By *H. N. Amyers*   Attorney 2,933,117
Patented Apr. 19, 1960

2,933,117

RUBBERY LAMINATED STRUCTURES

Francis P. Baldwin, Colonia, and Samuel B. Robison, Roselle, N.J., assignors to Esso Research and Engineering Company, a corporation of Delaware Application December 10, 1956, Serial No. 627,292

20 Claims. (Cl. 152—330)

This invention relates to laminated structures and particularly those used in pneumatic tire constructions. The present invention also relates to vulcanizable blends of high unsaturation rubbers, particularly natural rubber and/or diene synthetic rubbers, and brominated butyl rubber useful in adhering a chlorinated butyl rubber inner liner of a tubeless tire to a carcass layer containing at least one high unsaturation rubber such as diene synthetic rubbers and/or natural rubber or the like. The instant invention further relates to the production of high quality laminated structures such as conveyor or power transmission belting, steam hose, wire insulation, or especially tubeless tires containing at least four layers; namely, an inner lining of chlorinated butyl rubber, a carcass layer containing one or more highly unsaturated rubbers, an outer rubber layer containing at least one rubbery polymer, and a layer interposed between the inner lining and the carcass layer in the form of a tie ply, cement, or especially a band ply.

For the purposes of the present invention, the interposed layer must contain a major proportion, not more than about 85 weight percent, of a high unsaturated rubber, preferably natural rubber and/or GR-S rubber (a rubbery diene-styrene rubber) and a minor proportion, not less than about 15 weight percent, of brominated butyl rubber, the high unsaturation rubber being present in amounts of substantially above about 1½ times the weight of the brominated butyl rubber.

The present invention is a continuation-in-part of U.S. patent application entitled "Brominated Rubbery Polymers," U.S. Serial No. 625,638, filed on December 3, 1956, which in turn is a continuation-in-part of U.S. Serial No. 553,830, filed on December 19, 1955, both applications being in the names of Francis P. Baldwin and Samuel B. Robison.

The invention will be best understood from the following description when read in conjunction with the accompanying drawing in which the single figure is a vertical section of a pneumatic tubeless tire produced in accordance with the present invention.

It is known that butyl-type rubbery copolymers are ideally suited for use in inner tubes of tires because of their low air permeability. However, with respect to inner linings of tubeless tires, butyl rubber, although of low fluid-permeability, does not adhere satisfactorily to the interior of conventional high unsaturation carcass layers in such tires. This deficiency may only be partially overcome by the use of halogenated butyl rubbers such as brominated butyl rubber or especially chlorinated butyl rubber. Recent tests have shown that of all known unmodified or halogenated butyl rubbers, chlorinated butyl rubber, because of exceptionally good air impermeability, flex properties and especially heat-resistance and aging properties, is the ideal rubber for use as an inner liner of tubeless tires.

Accordingly, many attempts have recently been made to adhere chlorinated butyl rubber inner liners to carcasses containing highly unsaturated rubbery polymers and copolymers. For instance, the use of layers containing blends of 65 to 85 weight percent of high unsaturation rubbers and 15 to 35 weight percent of chlorinated butyl rubber, interposed between the inner liner and carcass, have been tried without materially increasing the adhesion of the liner to the carcass. It has, however, surprisingly been found that when such blends contain brominated butyl rubber instead of chlorinated butyl rubber, excellent adhesion to both the inner liner and carcass is obtained. This has been particularly surprising since for adhesion to tire cords, chlorinated butyl rubber has been found to be superior to brominated butyl rubber.

In accordance with the present invention, a chlorinated butyl rubber inner lining of a tubeless tire is adhered to a carcass containing one or more highly unsaturated rubbers by an interposed layer containing an admixture of about 65 to 85 weight percent, preferably about 70 to 80 weight percent, of a high unsaturation rubber such as Buna-N rubber, neoprene rubber, and/or especially GR-S rubber and/or natural rubber or the like, with about 15 to 35 weight percent, preferably about 20 to 30 weight percent of brominated butyl rubber. It has been found that when the composition of the above interposed layer contains the abovementioned ratios of rubbers and, per 100 parts by weight of total rubber, about 0.1 to 5.0, preferably about 0.5 to 2.0 parts by weight, of certain organic polyimino and preferably diimino compounds, about 2 to 40, preferably about 3 to 30 parts by weight of a zinc and oxygen containing compound such as zinc stearate or especially zinc oxide, and about 0.5 to 10.0, preferably about 1.0 to 5.0 parts by weight of sulfur, excellent adhesion is obtained between the carcass and inner liner.

For the purposes of the present invention, the polyimino compounds are preferably diimino compounds selected from one or more of the two following types:

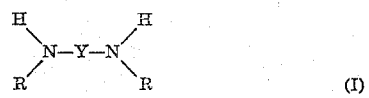
(I)

in which R is selected from the group consisting of $C_1$ to $C_{18}$ alkyl, aryl, aralkyl, and alkaryl groups, Y being selected from the group consisting of $C_1$ to $C_{12}$, preferably $C_2$ to $C_8$ alkyl groups

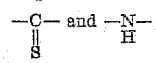

and

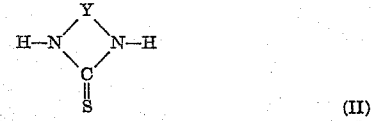
(II)

in which Y is selected from the group consisting of

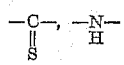

and $C_1$ to $C_{12}$, preferably $C_2$ to $C_8$ alkyl groups.

Typical compounds of type (I) include among others, polyaryl guanidines such as di-ortho-tolyl guanidine, diphenyl guanidine, sulfur-containing guanidines, condensation products of aniline and butyraldehyde, condensation products of formaldehyde and para-toluidine, or the like. Typical compounds of type (II) include among others, 2-mercapto imidazoline and/or ethylene thiourea.

Although best adhesions are obtained using the foregoing polyimino compounds without other accelerators, if a faster cure is desired, a minor proportion based on the guanidine, say about 2 to 25% by weight of mercaptobenzothiazole or derivatives of mercaptobenzothiazole such as benzothiazyl disulfide (the oxidation product of mercaptobenzothiazole), zinc benzothiazyl disulfide (the zinc salt of mercaptobenzothiazole) etc., may be added. If more than minor proportions based on the guanidine of such compounds are added, greatly reduced adhesions are obtained.

In the preferred embodiment of the present invention, 100 parts by weight of the chlorinated butyl rubbery copolymer to be used in the inner lining is compounded with about 2 to 30, preferably about 3 to 20 parts by weight of a zinc and oxygen containing compound such as zinc stearate or especially zinc oxide, about 0.3 to 5.0, preferably about 0.6 to 3.0 parts by weight of sulfur, and about 0.1 to 5.0, preferably about 0.5 to 2.0 parts by weight of an organic nitrogen compound containing at least one $$-\underset{H}{N}-$$

group and/or —$NH_2$— group. The compounded chlorinated butyl rubber composition formed is then strongly bonded to the carcass containing one or more high unsaturation rubbers, particularly natural rubber and/or GR–S rubber (a rubber diene-styrene copolymer) by means of an interposed rubber layer containing an admixture of a high unsaturation rubber and brominated butyl rubber in the proportions and compounded with the curatives as hereinbefore outlined, and preferably also with about 20–100 parts by weight of a filler such as carbon blacks, clays, silica, $CaCO_3$, diatomaceous earth, etc. and about 0–5 parts by weight, preferably about 0.5 to 2.0 parts by weight of a $C_{12}$ to $C_{20}$ monocarboxylic acid such as stearic acid and/or zinc salts thereof.

Butyl rubber is a vulcanizable rubbery hydrocarbon copolymer containing about 85 to 99.5%, preferably 95–99.5% of a $C_4$–$C_8$ isoolefin such as 2-methyl-1-butene, 3-methyl-1-butene, or especially isobutylene, the remainder being a $C_4$–$C_{14}$ multiolefin, preferably a $C_4$ to $C_6$ conjugated diolefin such as butadiene, dimethyl butadiene, piperylene or especially isoprene. The resulting copolymer generally has a Staudinger molecular weight of about 20,000 to 150,000 and an iodine number of about 0.5 to 50.0 (Wijs). The preparation of butyl-type rubbers is described in U.S. Patent 2,356,128 to Thomas et al. and also in other patents as well as in literature.

Brominated butyl rubber is produced by reacting the unvulcanized rubber copolymer with bromine or other suitable bromine-containing compounds so that the polymer contains a bromine content of at least about 0.8 weight percent bromine but not more than a bromine content of about 3 atoms per molecule of multiolefin present in the copolymer; i.e. a bromine content of not more than about 3 atoms of bromine per double bond in the copolymer. Typical brominating agents which may be employed are molecular bromine, sodium hypobromite, sulfur bromides, N-bromo-succinimide, tri-bromophenol bromide, N-bromoacetamide, and other common brominating agents. The preferred brominating agents are molecular bromine and/or such bromine compounds as N-bromosuccinimide, beta-bromoethyl phthalimide, N-bromoacetamide, bromo hydantoins, etc. The bromination is advantageously conducted at about —30° C. to about +120° C., preferably at about 20° to 80° C. for about one minute to several hours. However, the temperatures and times are regulated to brominate the rubbery copolymer to the extent abovementioned.

The bromination may be accomplished in various ways. One process comprises preparing a solution of the hydrocarbon copolymer as above, in a suitable unreactive organic solvent such as heptane, kerosene, toluene, chlorobenzene, trichloroethane, etc., and adding thereto gaseous or preferably liquid bromine or other brominating agent, optionally in solution, such as dissolved in methyl chloride, a carbon tetrahalide, etc. Another method resides in blending with the solid copolymer a solid brominating agent which is known to lead to allylic substitution such as N-bromosuccinimide or the like supra. In such a case, the blend formed is preferably mill-mixed and advantageously heated to a temperature sufficient to brominate the solid copolymer. The use of elevated or depressed pressures is optional since atmospheric pressure is satisfactory. However, the pressure may vary, depending upon the foregoing temperatures and reaction times from about 1 to 400 p.s.i.a.

Chlorinated butyl rubber is produced by mild chlorination of the unvulcanized hydrocarbon copolymer in a manner which does not degrade the molecular weight thereof, but sufficiently to produce a rubber which retains its tensile strength upon heat-aging. The chlorination is preferably carried out so as to make the resultant chlorinated butyl rubber contain about at least 0.5 weight percent (preferably at least about 1.0 weight percent combined chlorine, but not more than about "X" weight percent combined chlorine wherein:

$$X = \frac{35.46L}{(100-L)M_1 + L(M_2 + 35.46)} \times 100$$

and:

$L$=mole percent of the multi-olefin in the polymer
$M_1$=molecular weight of the isoolefin
$M_2$=molecular weight of the multi-olefin
35.46=atomic weight of chlorine Restated, there should be at least about 0.5 weight percent of combined chlorine in the polymer but not more than about 1 atom of chlorine combined in the polymer per molecule of multi-olefin present therein; i.e. not more than about one atom of combined chlorine per double bond in the polymer. The maximum mole percent of combined chlorine is generally about 0.25–0.80 times the mole percent unsaturation of the polymer. Normally the chlorine content of chlorinated copolymers containing up to about 15% combined multiolefin should be within about 0.1 to 10.0% chlorine preferably about 0.5 to 3.0% chlorine based on the total weight of rubbery copolymer.

Suitable chlorinating agents which may be employed are chlorine, alkali metal hypochlorites, oxygenated sulfur chlorides, pyridium chloride perchloride, alpha-chloroacetoacetanilide, beta-chloro-methyl phthalimide, and other common chlorinating agents. The preferred chlorinating agents are molecular chlorine, N-chlorosuccinimide, chloro-hydantoins and sulfuryl chloride. The chlorination is conducted at temperatures of above 0° up to about 100° C. and preferably at about 20° to 60° C. for about one minute to several hours. However, the temperatures and times are regulated to chlorinate the rubbery copolymer to the extent above-mentioned.

The chlorination is accomplished by preparing a solution of the above rubbery copolymer in an inert liquid solvent such as an inert hydrocarbon or advantageously halogenated derivatives of saturated hydrocarbons, examples of which are hexane, naphtha, mineral spirits, benzene, chloroform, carbon tetrachloride, etc., and adding thereto chlorine or other chlorinating agent, optionally in solution, such as dissolved in an alkyl chloride, carbon tetrachloride, etc. The use of elevated or depressed pressures is optional since atmospheric pressure is satisfactory although the pressure may vary, depending upon the foregoing temperatures and times from about 1 to 400 p.s.i.a.

The concentration of the butyl rubber in the solvent will depend upon the type of reactor, molecular weight of the butyl rubber, etc. In general, the concentration of a butyl rubber having a viscosity average molecular weight of about 100,000 to about 800,000, if the solvent is a substantially inert hydrocarbon, will be between about 1 and 80% by weight, preferably about 5 to 60%.

When chlorinating butyl rubber with gaseous chlorine, the chlorine gas may also be diluted with up to about 20 times its volume, preferably about 0.1 to 5.0 times its volume of an inert gas such as nitrogen, methane, ethane, carbon dioxide, etc. In chlorinating the butyl rubber with gaseous chlorine in batch procedure, the chlorine is preferably added relatively slowly to a preformed solution of the butyl rubber with agitation. The chlorine is advantageously added over a period of about 1 to 20 minutes depending upon the degree of agitation. The amount of gaseous chlorine added to a butyl rubber copolymer dissolved in a completely inert hydrocarbon is approximately twice that which is desired to be combined with the butyl polymer, since for one mole of chlorine, one chlorine atom combines with the polymer essentially by replacing a hydrogen atom from said polymer and the other atom is evolved as hydrogen chloride.

The resulting chlorinated butyl rubber polymer is similar in some respects to ordinary butyl rubber as to rubbery characteristics. It also has the property of being vulcanizable and covulcanizable with other rubbery polymers with zinc oxide and sulfur with or without added vulcanization accelerators such as thiuram polysulfides or other derivatives of thiocarbamic acids. The cure for example may be accomplished in the presence of such compositions as (1) zinc oxide, (2) zinc oxide and sulfur, (3) zinc oxide and tetramethyl thiuram disulfide, (4) sulfur and a zinc dialkyl polythiocarbamate, (5) primary or polyfunctional amino or polyfunctional imino compounds, (6) tellurium diethyl dithiocarbamate, (7) lead oxide and p-quinone dioxime with or without sulfur, (8) sulfur, benzothiazyl disulfide and p-quinone dioxime, (9) p-quinone dioxime dibenzoate, lead oxide, and sulfur, (10) zinc oxide and phenol dialcohol resins of the polymethylol phenol type, etc.

The chlorinated copolymer formed advantageously has a viscosity average molecular weight between about 250,000 and 2,000,000 and a mole percent unsaturation between about 0.2 to 20.0, advantageously about 0.4 to 10.0 and preferably about 0.6 to 3.0. This copolymer, when cured, has good to excellent tensile strength, extension modulus, abrasion resistance, elongation and flexure resistance and outstanding gas impermeability and heat aging properties. The copolymer before curing may be further compounded with various fillers such as clays, silica, MgO, CaO, titanium dioxide, etc., as well as with plasticizers which are preferably hydrocarbon plasticizer oils; antioxidants; etc.

Referring now to the drawing, the single figure depicts a pneumatic tubeless tire which comprises a hollow toroidal type member which is substantially U shaped in cross section by virtue of an open portion which extends around the inner periphery of the member. In other words, the tire is of a tubeless type structure which has a cross-section in the form of an open-bellied body with spaced terminal portions to define a member generally resembling a horseshoe. The terminal portions constitute bead portions 11—11 of the tire inside of which are a plurality of bead wires, adhesively imbedded and molded in a rubber. The outer surfaces of the bead portions and/or rim 12 are advantageously formed into an air-sealing means, such as a plurality of ribs to aid in adhesion of the bead portions to the rim when the tire is inflated. The outer surface of the tire also includes tread area 13 and sidewalls 14. The open portion of the horseshoe-shaped tire faces that portion of the inner circumference of the tire which is adjacent the said tread area 13 of the tire.

The remaining construction of the tire may vary according to the conventional fabrication, but in general, the tire is a multi-layered type of structure with an outer layer as hereinbefore mentioned. The layer next adjacent the outer layer comprises a carcass 15 which includes high unsaturation rubber or rubbers having incorporated therein a fabric composed of a plurality of cotton, rayon, nylon, and/or steel cords. The inner side of carcass 15 includes band-ply 17 which comprises a composition containing as the rubber constituents, about 65 to 85 weight percent of a high unsaturation rubber or rubbers such as natural rubber and/or GR–S rubber or the like, and about 15 to 35 weight percent of brominated butyl rubber. Band ply 17 is advantageously formed by coating either the interior side or both sides of the band ply fabric with the aforementioned composition containing the admixture of a high unsaturation rubber and brominated butyl rubber. Alternatively, band ply 17 may consist of the usual high unsaturation rubbery polymer or polymers and the band ply given a coating by calendering or especially by cementing one or both sides with a composition containing a mixture of a highly unsaturated rubber or rubbers, such as natural and/or GR–S rubber, and brominated butyl rubber in the proportions and compounded with the curatives as outlined above. The tire also includes an inner lining 16 made from chlorinated butyl rubber which has been at least partially vulcanized and preferably substantially completely vulcanized for about 1 to 300 minutes or more (e.g. 1 to 60 or 100 minutes) at temperatures between about 200° and 450° F. and preferably between about 250° and 400° F. This inner lining must be substantially impermeable to air. The above multi-layers, at least three in number, are conventionally bonded or otherwise adhered together, for example, by vulcanizing to form a tire of a unitary structure.

In order to more fully illustrate the present invention, the following experimental data are given:

Example I

Chlorinated butyl rubber, unmodified butyl rubber, and mixtures of natural rubber with brominated butyl rubber were compounded on a rubber mill into the compositions given hereinafter. The chlorinated butyl rubber employed contained 1.20% by weight combined chlorine and had an eight minute Mooney viscosity at 212° F. of 71.0, the mole percent unsaturation being 1.47. The brominated butyl rubber used was a commercially available rubber known as Hycar 2202 containing 3.3% by weight bromine content, and having an eight minute Mooney viscosity at 212° F. of 60 and a mole percent unsaturation of 1.5. The unmodified butyl rubber employed had an eight minute Mooney viscosity at 212° F. of 46, a mole percent unsaturation of 1.8 and a viscosity average molecular weight of 350,000. The compounding was as follows:

| Compound | Parts by Weight | | | | | | | |
|---|---|---|---|---|---|---|---|---|
| | 1 | 2 | 3 | 4 | 5 | 6 | 7 | 8 |
| Natural Rubber (Smoked Sheets) | 90 | 80 | 70 | 80 | | | | |
| Brominated Butyl Rubber | 10 | 20 | 30 | 20 | | | | |
| Chlorinated Butyl Rubber | | | | | 100 | 100 | | 100 |
| Unmodified Butyl Rubber | | | | | | | 100 | |
| Stearic Acid | 1 | 1 | 1 | 1 | | | 1 | 1 |
| MPC Carbon Black (Kosmobile S-66) | 40 | 40 | 40 | | | | | |
| SRF Carbon Black (Gastex) | | | | 50 | 50 | 50 | 50 | 50 |
| Necton 60 Plasticizer Oil [1] | | | | | | 5 | 5 | 5 |
| Amberol ST–137 Resin [2] | | | | | | 5 | | |
| Zinc Oxide | 5 | 5 | 5 | 5 | 5 | 5 | 5 | 5 |
| Sulfur | 2 | 2 | 2 | 2 | 2 | 2 | 2 | 2 |
| Santocure [3] | | | | | 0.7 | 0.7 | 1.5 | 1.5 |
| Di-orthotolyl guanidine | 1 | 1 | 1 | 1 | | | | |

[1] The plasticizer is an oil derived from a naphthenic base crude and has the following properties:

| Property | Employed | Typical Range |
|---|---|---|
| Specific Gravity | 0.90 | 0.80–0.98 |
| Flash Point, ° F. (open cup method) | 445 | 300–550 |
| Viscosity, SSU at 100° F | 510 | 50–1,000 |
| Viscosity, SSU at 210° F | 55 | 20–200 |
| Iodine No. (cg./g.) | 16 | 0–30 |

[2] Amberol ST–137 resin is 2,6 dimethylol-4-octyl phenol active resin.
[3] Santocure is N-cyclohexyl-2-benzothiazole sulfenamide.

The foregoing compounded rubbery compositions were then molded into adhesion sandwiches having dimensions of 6 x 2 x ¼ inch wherein ⅛ inch of the ¼ inch thickness was a composition containing either chlorinated butyl rubber or unmodified butyl rubber, the remaining ⅛ inch thickness being a composition containing the various admixtures of brominated butyl rubber and natural rubber in the proportions and compounded as described above. To each side was then applied a single layer of light cotton duck to reinforce the sandwich. Each sandwich was then cured in the mold for 45 minutes at 307° F., the respective physical properties of each vulcanizate formed being as follows:

| Compound | 1 | 2 | 3 | 4 | 5 | 6 | 7 | 8 |
|---|---|---|---|---|---|---|---|---|
| Modulus at 300% Elong. (p.s.i.) | 1,200 | 1,360 | 1,470 | 1,975 | 1,050 | 990 | 400 | 800 |
| Tensile Strength (p.s.i.) | 2,215 | 2,440 | 2,560 | 2,475 | 1,970 | 1,580 | 2,180 | 1,760 |
| Elongation (percent) | 445 | 445 | 460 | 390 | 495 | 535 | 755 | 615 |

Strips having a width of one inch and a length of 6 inches were then cut out of the center of the respective sandwiches. The strips were then preheated to 212° F. for 30 minutes. They were then immediately tested by means of a Scott tensile tester operating at a jaw separation rate of 2 inches per minute. The force required to separate the sandwiched layers in the strip was then recorded, the results being as follows:

Test No.:                 Pounds per inch
- (A) Adhesion of compound 5 to compound 1 -- 22
- (B) Adhesion of compound 5 to compound 2 -- 45
- (C) Adhesion of compound 5 to compound 3 -- 42
- (D) Adhesion of compound 6 to compound 1 -- 15
- (E) Adhesion of compound 6 to compound 2 -- 35
- (F) Adhesion of compound 6 to compound 3 -- 40
- (G) Adhesion of compound 4 to compound 7 -- 4.0
- (H) Adhesion of compound 4 to compound 8 -- 45

Example II

The same general procedure and same rubbers as in Example I were used in the following masterbatches:

MASTERBATCH A

| | Pts. by weight |
|---|---|
| Chlorinated butyl rubber | 100 |
| F.T. carbon black (P-33) | 50 |
| H.M.F. carbon black (Philblack A) | 15 |
| Plasticizer oil (Necton 60) | 7.0 |
| Stearic acid | 1.0 |
| Zinc oxide | 5.0 |
| Sulfur | 2.0 |

MASTERBATCH B

| | Pts. by weight |
|---|---|
| Brominated butyl rubber | 20 |
| Natural rubber (smoked sheets) | 80 |
| E.P.C. black (Cabot No. 9) | 10 |
| S.R.F. black (Pelletex) | 25 |
| Stearic acid | 1.0 |
| Phenyl-beta-naphthylamine | 1.0 |
| Pine tar | 1.0 |
| Rosin oil | 1.5 |
| Sulfur | 3.0 |

Various accelerators were then compounded into the above masterbatches. Sandwich adhesion data was then obtained as in Example I to show the adhesion of compounded masterbatch A to compounded masterbatch B. The results were as follows:

| Accelerators added to Masterbatch A (Each at 0.5 part) | Accelerators added to Masterbatch B | | | | |
|---|---|---|---|---|---|
| | Diortho-tolyl Guanidine (1 part) | Diphenyl Guanidine (1.25 pts.) | Accel. 808 (1 pt.) | Accel. NA-22 (1 pt.) | .75 pt. Altax [1]; .10 pt. Zimate [2] |
| N-cyclohexyl-2-benzothiazolesulfenamide (Santocure) | 50 | 40 | 35 | 32 | 3.0 |
| Diorthotolyl guanidine | 43 | 42 | 35 | 35 | 7.0 |
| Diphenyl guanidine | 48 | 37 | 35 | 36 | 6.5 |
| Aniline-Butyraldehyde condensation product (Accelerator 808) | 46 | 33 | 33 | 37 | 5.0 |
| Ethylene Thiourea (NA-22) | 33 | 36 | ------ | 33 | 3.0 |

[1] Altax is benzothiazyl disulfide.
[2] Zimate is zinc dimethyl dithiocarbamate.

The above data show that excellent adhesion of chlorinated butyl rubber to a mixture of 70–80 parts by weight of natural rubber and 20–30 parts by weight of brominated butyl rubber is obtained in accordance with the present invention. The data also indicates that 10 parts by weight of brominated butyl rubber (compound No. 1) is insufficient to give good adhesion (see tests A and D). Tests E and F indicated that good adhesion is obtained by curing in the presence of polymethylol phenol active resins. Test G shows that unmodified butyl rubber may not be substituted for chlorinated butyl rubber in the inner liner without adversely affecting adhesion.

The above data show that when using organic polyimino compounds in accordance with the present invention, adhesion values of 33 to 50 pounds per inch are obtained, whereas the use of only such conventional accelerators as benzothiazyl disulfide and/or zinc dimethyl dithiocarbamate in the interposed layer results in poorer adhesions of only between about 3 and 7 pounds per inch.

Example III

The same general procedure and same rubbers as in Example I were again used. Adhesions for the band-ply type composition to both a chlorinated butyl rubber inner liner type composition and two different carcass type compositions were then determined. In the band-ply type compositions, a blend of natural rubber and brominated butyl rubber, in accordance with the invention, and a blend of natural rubber and chlorinated butyl rubber were compared for adhesion to the inner liner. In all compositions, the chlorinated butyl rubber and brominated butyl rubber were the same as outlined in Example I. The compounding and adhesion data for sandwiches cured for 25 minutes at 307° F., tested in accordance with Example I, were as follows:

|  | Parts By Weight | | | | | |
| --- | --- | --- | --- | --- | --- | --- |
|  | Band Ply Composition | | Inner Liner Composition | | Carcass Composition | |
| Sample | A [1] | B [1] | C | D | E | F [2] |
| Component: | | | | | | |
| Natural Rubber (Smoked Sheets) | 80 | 80 | | | 100 | 30 |
| GR-S-1500 Rubber | | | | | | 70 |
| Brominated Butyl | 20 | | | | | |
| Chlorinated Butyl | | 20 | 100 | 100 | | |
| Stearic Acid | 1.0 | 1.0 | 2.0 | 1.0 | 1.0 | 1.0 |
| F.T. Black (P-33) | | | 50 | 50 | | |
| H.M.F. Black (Philblack A) | | | 15 | 15 | | |
| E.P.C. Black (Cabot No. 9) | 10 | 10 | | | 10 | 10 |
| S.R.F. Black (Pelletex) | 25 | 25 | | | 25 | 25 |
| Pine Tar | 1.0 | 1.0 | | | 1.0 | 1.0 |
| Rosin Oil | 1.5 | 1.5 | | | 1.5 | 1.5 |
| Phenyl-beta-naphthylamine | 1.0 | 1.0 | | | 1.0 | 1.0 |
| Plasticizer Oil (Necton 60) | | | 7.0 | 7.0 | | |
| Zinc Oxide | 5.0 | 5.0 | 5.0 | 5.0 | 5.0 | 5.0 |
| Sulfur | 3 | 3 | | 2 | 3 | 2.5 |
| Diorthotolyl guanidine | 1 | 1 | | | 1 | |
| Santocure | | | | | | 1 |

[1] Hot Milled 5 min. at 307° F.
[2] Cured at 287° F. for 45 min.

The physical inspections were as follows, all values obtained being satisfactory:

| Property | Sample A | Sample B | Sample C | Sample D |
| --- | --- | --- | --- | --- |
| Modulus at 300% Elong. (p.s.i.) | 1,420 | 1,480 | 430 | 310 |
| Tensile Strength (p.s.i.) | 3,100 | 2,630 | 1,350 | 1,500 |
| Elongation (percent) | 525 | 460 | 695 | 790 |

Adhesion tests were run in the manner described in Example I, the results being as follows:

Tests: Adhesion in pounds per inch
1. sample C to sample A _____ 55
2. sample C to sample B _____ 9
3. sample D to sample A _____ 50
4. sample D to sample B _____ 15
5. sample A to sample E _____ 65
6. sample A to sample F _____ 45

The above data show that excellent adhesion is obtained between a chlorinated butyl rubber inner lining type composition and a band-ply type composition containing natural rubber and brominated butyl rubber (tests 1 and 3) but not when substituting chlorinated butyl for brominated butyl (tests 2 and 4). The data also demonstrates the excellent adhesion between a natural rubber-brominated butyl band-ply type composition and carcass type compositions containing natural rubber or natural rubber plus GR-S rubber (tests 5 and 6).

*Example IV*

The same general procedure and same rubbers as in Examples I and III were employed. Adhesion for a band ply type composition containing a blend of brominated butyl rubber with a major proportion of natural rubber and a minor proportion of GR-S rubber to a chlorinated butyl rubber inner lining type composition was then determined. The compounding and adhesion data for a test sandwich cured for 45 minutes at 307° F., tested in accordance with Example I were as follows:

Component: Parts by weight
Natural rubber (smoked sheets) _____ 42
GR-S-1500 rubber _____ 28
Brominated butyl rubber _____ 30
Stearic acid _____ 1.0
E.P.C. black (Cabot No. 9) _____ 10
S.R.F. (Pelletex) _____ 25
Pine tar _____ 1.0
Rosin oil _____ 1.5
Zinc oxide _____ 5.0
Sulfur _____ 2.5
Aniline-butyraldehyde condensation product (Accelerator 808) _____ 1.0

The physical inspections were as follows:

Property: Value
Modulus at 300% elong. (p.s.i.) _____ 590
Tensile strength (p.s.i.) _____ 2060
Elongation (percent) _____ 670

An adhesion test was then run in the manner described in Example I, the results being as follows:

Adhesion in pounds per inch
Adhesion of band-ply type composition to sample D__ 43

The above data show that excellent adhesion is obtained between a chlorinated butyl rubber inner lining type composition and a band-ply type composition in accordance with the invention containing an admixture of brominated butyl rubber and a blend of natural rubber with GR-S rubber. This indicates the interchangeability of one high unsaturation for another for use in band-ply type compositions in accordance with the present invention.

Resort may be had to modifications and variations of the disclosed embodiments of the present invention without departing from the spirit of the invention or the scope of the appended claims.

What is claimed is:

1. A laminated structure containing a first layer comprising a chlorinated derivative of a rubbery copolymer of a $C_4$–$C_8$ isoolefin and a $C_4$–$C_{14}$ multiolefin, said derivative containing at least about 0.5 weight percent combined chlorine based on the total weight of copolymer but not more than about 1 combined atom of chlorine per mole of double bonds in the copolymer, a second layer comprising at least one high unsaturation rubber, and a layer interposed between said first and second layers comprising a mixture of about 65 to 85 weight percent of at least one high unsaturation rubber and about 15 to 35 weight percent of a brominated derivative of a rubbery copolymer of a $C_4$–$C_8$ isoolefin and a $C_4$–$C_{14}$ multiolefin, said last-named derivative having a bromine content of at least about 0.8 weight percent based on the total weight of copolymer but not more than a bromine content of about 3 atoms of bromine per mole of double bonds in the copolymer, the interposed layer containing, per 100 parts by weight of total rubber, an admixture comprising about 0.1 to 5.0 parts by weight of a nitrogen containing organic polyimine, about 2 to 40 parts by weight of a zinc and oxygen containing compound, and about 0.3 to 10.0 parts by weight of sulfur.

2. A laminated structure according to claim 1 in which the polyimine is a diimine.

3. A laminated structure according to claim 1 in which the polyimine is a sulfur-containing guanidine.

4. A laminated structure according to claim 1 in which the polyimine is an alkylene thiourea.

5. A laminated structure according to claim 1 in which the polyimine is a mercaptoimidazoline.

6. A laminated structure according to claim 1 in which 100 parts by weight of the chlorinated derivative of the rubbery isoolefin-multiolefin copolymer is in composition with about 2 to 30 parts by weight of a zinc and oxygen containing compound, about 0.3 to 5.0 parts by weight of sulfur and about 0.5 to 5.0 parts by weight of an organic polyimine.

7. A laminated structure according to claim 1 which has been vulcanized by heating the same in the substantial absence of mercaptobenzothiazole and derivatives of mercaptobenzothiazole for a time of between about one minute and about 5 hours at a temperature level between about 200° and 450° F.

8. A laminated structure according to claim 1 in which the high unsaturation rubber in admixture with the brominated derivative of a rubber copolymer of a $C_4$ to $C_8$ isoolefin and a $C_4$ to $C_{14}$ multiolefin is present in an amount based on total rubbers of between about 70 and 80 weight percent.

9. A laminated structure according to claim 1 in which the brominated derivative of a rubbery copolymer of a $C_4$ to $C_8$ isoolefin and a $C_4$ to $C_{14}$ multiolefin does not have a bromine content of more than about two atoms of bromine per mole of double bonds in the copolymer.

10. A laminated structure according to claim 1 in which the interposed layer contains a polyimine which is a di-aryl guanidine containing about 6 to 18 carbon atoms.

11. A laminated structure according to claim 1 in which the interposed layer contains a polyimine which is an aldehyde-amine condensation product.

12. A tubeless rubber tire containing an inner lining of a chlorinated butyl rubber copolymer of a $C_4$ to $C_8$ isoolefin and a $C_4$ to $C_{14}$ multiolefin, said copolymer containing at least 0.5 weight percent combined chlorine but not more than about one combined chlorine atom per mole of double bonds in the rubber, 100 parts by weight of said rubber being in composition with about 2 to 30 parts by weight of zinc oxide, about 0.5 to 5.0 parts by weight of sulfur, and about 0.1 to 5.0 parts by weight of an organic compound containing at least one radical selected from the group consisting of an

group, an

group, and mixtures thereof, a carcass layer containing at least one high unsaturation rubber selected from the group consisting of natural rubber, diene-styrene copolymers and mixtures thereof, and a layer, interposed between the inner lining and carcass, containing a mixture of about 70–80 weight percent of a high unsaturation rubber selected from the group consisting of natural rubber, diene-styrene copolymers, and mixtures thereof and about 20–30 weight percent of a brominated butyl rubber copolymer of a $C_4$ to $C_8$ isoolefin and a $C_4$ to $C_{14}$ multiolefin, said copolymer having a bromine content of at least about 0.8 weight percent but not more than about 3 atoms of bromine per mole of double bond in the rubber, 100 parts by weight of said mixture being in composition with about 0.1 to 5.0 parts by weight of an organic polyimine, about 2 to 40 parts by weight of a zinc and oxygen containing compound, and about 0.5 to 10.0 parts by weight of sulfur.

13. A tubeless rubber tire according to claim 12 in which the polyimine is a diimine selected from the group consisting of diimines having the structure

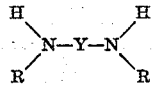

and diimines having the structure

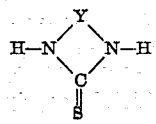

in which R is selected from the group consisting of $C_6$ to $C_{18}$ aryl, alkaryl and aralkyl groups, Y being selected from the group consisting of

$C=S$, and $C_1$ to $C_{12}$ alkyl groups.

14. A tubeless rubber tire according to claim 13 in which the inner lining, carcass, and interposed layer have been vulcanized together at a temperature level between about 250° and 400° F. for between about 5 and 60 minutes.

15. A tubeless rubber tire according to claim 14 in which the interposed layer is a band ply, which is a layer containing imbedded tire cords therein, said band ply being free of mercaptobenzothiazole and derivatives of mercaptobenzothiazole.

16. A tubeless rubber tire containing an inner lining of a chlorinated isoolefin-multiolefin butyl rubber copolymer containing at least about 0.5 weight percent chlorine but not more than about 1 combined atom of chlorine per double bond in said copolymer, a carcass layer containing at least one high unsaturation rubber, and an interposed layer containing a mixture of about 65 to 85 weight percent of at least one high unsaturation rubber and about 15 to 35 weight percent of a brominated isoolefin-multiolefin butyl rubber copolymer containing at least about 0.8 weight percent bromine but not more than about 3 combined atoms of bromine per double bond in said copolymer, 100 parts by weight of said mixture having been blended with a composition comprising about 0.1–5.0 parts by weight of an organic polyimine, about 0–25 weight percent based on organic polyimine of a member selected from the group consisting of mercaptobenzothiazole and derivatives of mercaptobenzothiazole, about 2–30 parts by weight of a zinc and oxygen containing compound, about 0–5 parts by weight of a member selected from the group consisting of a stearic acid, zinc stearate, and mixtures thereof, about 0.5–5.0 parts by weight of sulfur and about 20–100 parts by weight of a filler.

17. A method of bonding a high unsaturation band ply to a chlorinated isoolefin-diolefin butyl rubber copolymer containing inner lining for producing tubeless tires which comprises interposing between the band ply and the inner lining a layer consisting essentially of 100 parts by weight of a mixture of about 65–85 weight percent of at least one high unsaturation rubber and about 15 to 35 weight percent of a brominated butyl rubber copolymer of a $C_4$ to $C_8$ isoolefin and a $C_4$ to $C_6$ diolefin, said copolymer containing at least 0.5 weight percent bromine but not more than about 3 atoms of bromine per mole of double bonds in the copolymer, about 0.5 to 2.0 parts by weight of an organic diimine, about 3 to 20 parts by weight of a zinc and oxygen containing compound, about 0.3 to 5.0 parts by weight of sulfur and about 20 to 100 parts by weight of a filler, and curing the resulting laminated structure until at least 30 lbs. per inch adhesion between the respective layers is obtained.

18. A tubeless rubber tire according to claim 12 in which the interposed layer contains, per 100 parts by weight of total rubber, about 20 to 100 parts by weight of carbon black.

19. A tubeless rubber tire according to claim 12 in which 100 parts by weight of the chlorinated isoolefin-multiolefin butyl rubber of the inner lining is in composition with about 2 to 30 parts by weight of a zinc and oxygen containing compound, about 0.5 to 5.0 parts by weight of sulfur, about 0.1 to 5.0 parts by weight of an organic diimine and about 20 to 100 parts by weight of a filler.

20. A method for producing a laminated pneumatic hollow body comprising an inner layer containing chlorinated isoolefin-diolefin butyl rubber, a high unsaturation rubber and fabric containing layer and an adhesive band ply type layer interposed between said inner layer and said fabric-containing layer, which comprises forming said interposed band ply type layer of a composition comprising about 65–85 wt. percent of a high unsaturation rubber and about 15–35 weight percent of a brominated isoolefin-diolefin butyl rubber copolymer containing at least about 0.8 weight percent combined bromine but not more than about 3 atoms of combined bromine per double bond in the copolymer, and curing in the absence of mercaptobenzothiazole and derivatives of mercaptobenzothiazole, about 100 parts by weight of the total rubber in at least the interposed layer, in the presence of an admixture of about 3 to 20 parts by weight of at least one zinc and oxygen containing compound, about 0.1 to 5.0 parts by weight of an organic polyimine, about 20 to 100 parts by weight of carbon black and about 0.5 to 5.0 parts by weight of sulfur at a temperature level between about 200° and 450° F. for a time of between about 1 minute and 5 hours.

References Cited in the file of this patent

UNITED STATES PATENTS

| | | |
|---|---|---|
| 2,442,083 | Hall et al. | May 25, 1948 |
| 2,631,984 | Crawford et al. | Mar. 17, 1953 |
| 2,698,042 | Perkins | Dec. 28, 1954 |
| 2,732,354 | Morrissey et al. | Jan. 24, 1956 |
| 2,788,839 | Kindle et al. | Apr. 16, 1957 |
| 2,804,448 | Hallenbeck | Aug. 27, 1957 |